United States Patent
Peake, Jr. et al.

(10) Patent No.: US 7,275,097 B2
(45) Date of Patent: Sep. 25, 2007

(54) SYSTEM AND METHOD FOR ANALYZING INPUT/OUTPUT ACTIVITY ON LOCAL ATTACHED STORAGE

(75) Inventors: William Peake, Jr., Manassas, VA (US); Colleen McLaughlin, Colorado Springs, CO (US); Daniel B. Kyler, Colorado Springs, CO (US)

(73) Assignee: Precise Software Solutions Ltd., Or-Yehuda (IL)

( * ) Notice: Subject to any disclaimer, the term of this patent is extended or adjusted under 35 U.S.C. 154(b) by 190 days.

(21) Appl. No.: 10/369,675

(22) Filed: Feb. 21, 2003

(65) Prior Publication Data

US 2004/0024921 A1 Feb. 5, 2004

Related U.S. Application Data

(60) Provisional application No. 60/357,828, filed on Feb. 21, 2002.

(51) Int. Cl.
*G06F 15/173* (2006.01)
(52) U.S. Cl. ............... 709/223; 709/203; 709/213; 707/1; 707/200; 710/15; 710/18; 710/28; 710/46; 719/316
(58) Field of Classification Search .......... 709/223, 709/224; 710/18, 28, 46, 15, 58; 707/103 R, 707/2, 200; 719/316
See application file for complete search history.

(56) References Cited

U.S. PATENT DOCUMENTS

| | | | | |
|---|---|---|---|---|
| 5,390,188 A * | 2/1995 | Dawson | .................. | 714/717 |
| 5,471,617 A * | 11/1995 | Farrand et al. | ............. | 718/100 |
| 5,751,964 A * | 5/1998 | Ordanic et al. | ............. | 709/224 |
| 5,760,719 A * | 6/1998 | Graf | .................. | 341/100 |
| 5,787,309 A * | 7/1998 | Greenstein et al. | ......... | 710/36 |
| 5,893,086 A * | 4/1999 | Schmuck et al. | ............. | 707/1 |
| 5,978,594 A * | 11/1999 | Bonnell et al. | ............. | 710/17 |
| 6,012,152 A * | 1/2000 | Douik et al. | .................. | 714/26 |
| 6,101,500 A * | 8/2000 | Lau | .................. | 707/103 R |
| 6,112,257 A * | 8/2000 | Mason et al. | ............. | 710/18 |
| 6,122,664 A | 9/2000 | Boukobza et al. | | |
| 6,148,335 A * | 11/2000 | Haggard et al. | ............. | 709/224 |
| 6,205,441 B1 * | 3/2001 | Al-omari et al. | ............. | 707/2 |
| 6,253,254 B1 * | 6/2001 | Erlenkoetter et al. | ....... | 719/316 |
| 6,289,353 B1 * | 9/2001 | Hazlehurst et al. | ......... | 707/102 |
| 6,397,359 B1 * | 5/2002 | Chandra et al. | ............. | 714/712 |
| 6,446,123 B1 * | 9/2002 | Ballantine et al. | ......... | 709/224 |
| 6,480,955 B1 | 11/2002 | DeKoning et al. | | |
| 6,553,403 B1 * | 4/2003 | Jarriel et al. | ................. | 709/202 |
| 6,681,232 B1 * | 1/2004 | Sistanizadeh et al. | .... | 707/104.1 |

(Continued)

*Primary Examiner*—Michael Y. Won
(74) *Attorney, Agent, or Firm*—Meyertons Hood Kivlin Kowert & Goetzel, PC; B. Noël Kivlin

(57) ABSTRACT

A system, method and computer program product for analyzing file I/O activity on local attached storage devices within a computer network is provided. In an embodiment, a software agent executes on one or more servers within the network, and monitors the I/O activity on the network's local attached storage (e.g., SAN, NAS, and IDE and SCSI disks). A management interface is also provided for monitoring I/O activity-related data and for receiving reports on such I/O activity. In an embodiment, collected I/O-related data and any predefined I/O metrics are stored in a central repository (e.g., a relational database). The system, method and computer program product provide accurate metrics to assists system administrators in deciding, justifying and validating resource purchases for and allocations within the network.

18 Claims, 3 Drawing Sheets

U.S. PATENT DOCUMENTS

| | | |
|---|---|---|
| 6,732,176 B1 * | 5/2004 | Stewart et al. .............. 709/227 |
| 6,745,382 B1 * | 6/2004 | Zothner ...................... 717/107 |
| 6,769,071 B1 * | 7/2004 | Cheng et al. ................... 714/4 |
| 6,772,097 B1 | 8/2004 | Kromenaker et al. |
| 6,775,739 B1 * | 8/2004 | Bachmat et al. ............ 711/114 |
| 6,799,147 B1 | 9/2004 | Balasubramanian et al. |
| 6,816,898 B1 * | 11/2004 | Scarpelli et al. ............. 709/224 |
| 6,832,236 B1 * | 12/2004 | Hamilton et al. ............ 718/100 |
| 6,834,256 B2 * | 12/2004 | House et al. ................ 702/181 |

* cited by examiner

SYSTEM AND METHOD FOR ANALYZING INPUT/OUTPUT ACTIVITY ON LOCAL ATTACHED STORAGE

This application claims priority from U.S. Provisional Application Ser. No. 60/357,828, filed Feb. 21, 2002. The entirety of that provisional application is incorporated herein by reference.

BACKGROUND OF THE INVENTION

1. Field of the Invention

The present invention relates generally to computer network storage subsystems (i.e., integrated collections of storage controllers and/or host bus adapters; storage devices such as disks, CD ROMs, tapes, etc.; and control software), and more particularly to systems and methods for monitoring and reporting on the input/output activity on local attached storage devices.

2. Related Art

Within a computer system, file performance is a crucially important part of application performance and is often forgotten. Much of the performance bottlenecks involve file input/output (I/O) performance due to extremely frequent access to files.

Because application performance is essential to a computer system's performance, and file I/O performance is an important metric of overall application performance, then effective performance measurement must include file performance. Consequently, if file I/O performance can be increased—given that it is often the performance bottleneck—then better overall application performance will result.

One can simply assume that, for instance, employing a faster disk storage device will increase file I/O performance (i. e., faster file communications). However, there is no way of measuring how much faster, if at all, employing such a storage device will result. That is, there is no way of providing accurate and precise numbers to prove the assumption that employing a faster disk storage device will increase file I/O performance. Thus, system administrators and the like have no way of deciding, justifying or validating whether the added costs of these faster storage devices have any affect. Because better performance usually commands a premium price, it is necessary to have empirical numbers when system administrators have to take such action.

Therefore, given the foregoing, what is needed is a system, method and computer program product for analyzing I/O activity. The system, method and computer program product should be able to monitor I/O activity on local attached storage, provide a management interface to monitor and receive reports on such I/O activity, and thereby allow system administrators to have access to accurate metrics for system resource decision making.

SUMMARY OF THE INVENTION

The present invention meets the above-identified needs by providing a system, method and computer program product for analyzing I/O activity on storage devices (e.g., local attached storage).

The system of the present invention, in an embodiment, includes a repository for storing a list of the managed objects to be monitored within the network, thresholds establishing a limit for I/O metrics for each managed object, and corresponding threshold actions to be executed when an established threshold is exceeded. The system further includes a collector engine capable of collecting, for a pre-determined time interval, I/O metrics for each managed object, and a service process capable of determining, after the pre-determined time interval, whether any of the thresholds have been exceeded for any of the managed objects. The service process is also capable of executing the appropriate threshold action when a threshold has been determined to be exceeded.

In an embodiment, the system also includes a graphical user interface capable of causing reports to be generated that identify any thresholds which have been exceeded for any of the managed objects.

The method and computer program product of the present invention, in an embodiment, include the steps of having a system administrator identify managed objects to be monitored within the network, and define thresholds establishing a limit related to at least one I/O metric for each managed object and threshold actions to be taken when a threshold is exceeded. The method and computer program product further includes the steps of collecting, for a pre-determined time interval, I/O metrics for each of the managed objects, determining, after the pre-determined time interval, whether any thresholds have been exceeded, and executing the appropriate threshold action when any thresholds have been exceeded.

An advantage of the present invention is that it provides I/O performance analysis which allow system and database administrators to identify problematic storage devices or files, isolates I/O problems to a specific managed object, indicates the cause of any I/O problems and suggests a set of solutions for each identified I/O problem.

Another advantage of the present invention is that it supports any local attached storage which may be in the form of a storage area network (SAN), network attached storage (NAS), Small Computer Interface System (SCSI) disks, Integrated Drive Electronics (IDE) disks or the like.

Another advantage of the present invention is that it provides a facility for allowing a user to establish limits for selected I/O metrics for selected managed objects, and proactively alerts the user if these certain I/O metrics deviate from the limits for a managed object. The present invention also allows a user to establish actions to be taken when a managed object deviates from established limits (i.e., thresholds) and then takes the predefined actions when certain I/O metrics for a managed object deviate from the predefined thresholds.

Yet another advantage of the present invention is that— given today's IT environment where system and database administrators are overloaded and do not have time to do be assaulted by unnecessary information—users are only alerted when something will go awry in the near future before it is actually a problem at the level system end-users would normally be aware of.

Yet another advantage of the present invention is that it allows users to be able to create custom reports on I/O performance and view and analyze such reports on computers which may or may not be separate from where the data collection took place and where a central repository of collected data is stored.

Further features and advantages of the invention as well as the structure and operation of various embodiments of the present invention are described in detail below with reference to the accompanying drawings.

DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
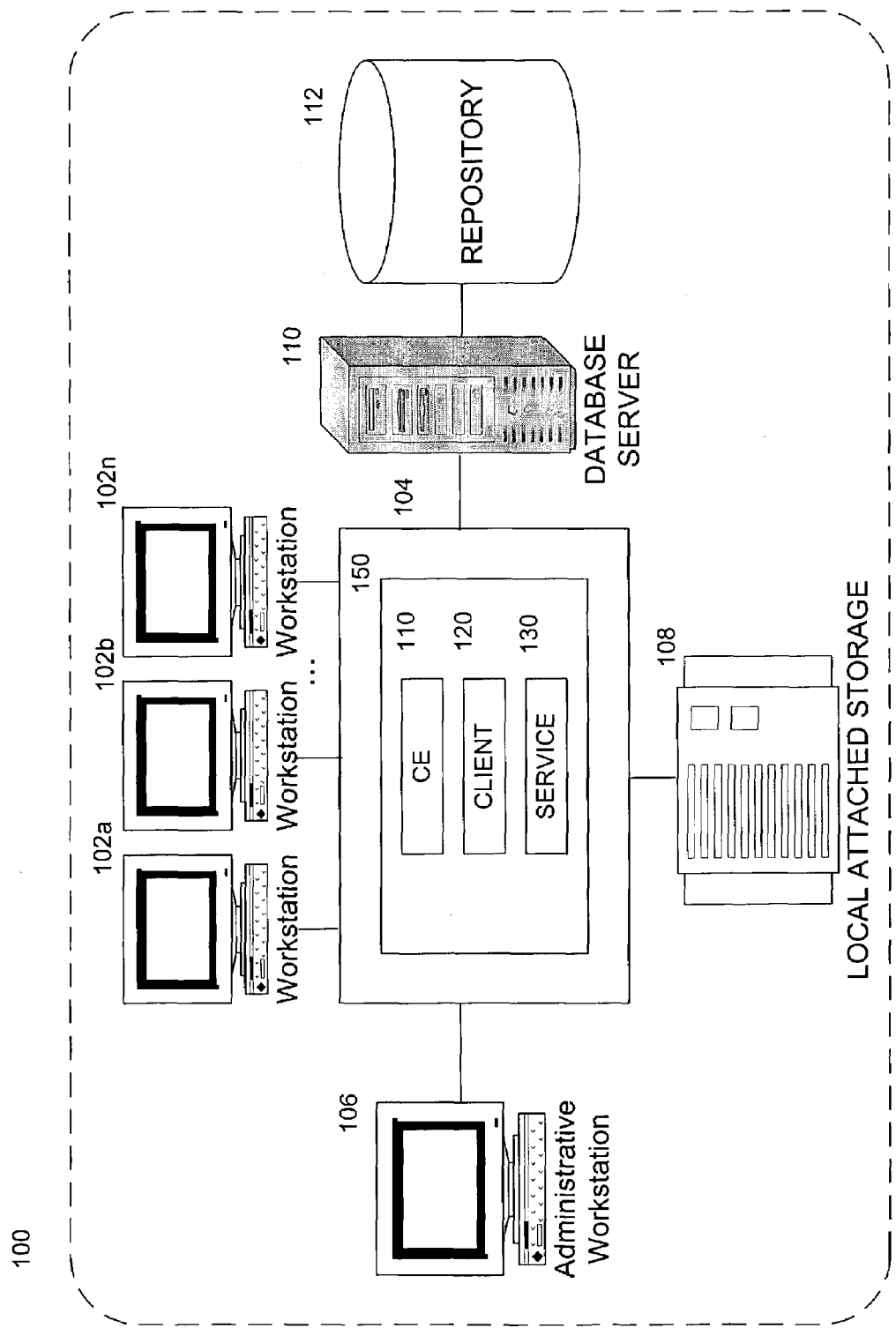
FIG. 1 is a block diagram illustrating the physical architecture of a computer network in which the present invention, according to an embodiment, would operate.

The present invention provides a system, method and computer program product for analyzing I/O activity.

In an embodiment, a software agent is provided that executes on one or more servers within a network, where each server is running the Microsoft® Windows 2000™ or XP™, IBM® AIX™ or Sun® Solaris™ operating system. The software agent monitors the I/O activity on the network's local attached storage device (i.e., one or more disk volumes). A management interface is also provided for monitoring I/O activity-related data and for reporting purposes.

In an embodiment, collected I/O-related data and any predefined I/O metrics are stored in a central repository. In one embodiment, the central repository is a relational database (e.g., Oracle9i™ or Microsoft® SQL Server™ database) residing on a database sever which is separate from the application server where the I/O analyzer agent is executing.

The present invention is now described in more detail herein in terms of the above example. This is for convenience only and is not intended to limit the application of the present invention. In fact, after reading the following description, it will be apparent to one skilled in the relevant art(s) how to implement the following invention in alternative embodiments (e.g., for different networks, operating systems and/or storage devices than those mentioned herein).

The terms "user," "system administrator," "database administrator," and the plural form of these terms may be used interchangeably throughout herein to refer to those who would access, use, and/or benefit from the tool that the present invention provides for analyzing (i.e., monitoring and reporting) I/O activity on local attached storage.

II. Glossary

Below are definitions of terms used herein. In the event that a term defined herein has a more common meaning or usage, the definition provided herein should be taken as the intended meaning.

"I/O Analyzer" shall mean a software agent, installed on a server that collects, stores and a monitors file I/O and physical disk I/O activity and is accessed through a programming interface.

"Collector Engine" shall mean a component of the I/O Analyzer that includes of a set of I/O filter drivers that layer on the file system and storage subsystem to collect I/O information.

"Collection Data" shall mean I/O activity-related data that is gathered by the Collector Engine.

"Client" shall mean a (graphical) user interface (UI) that displays collection data and provides configuration control and all client functions for the I/O Analyzer.

"Service" shall mean a component of the I/O Analyzer that performs management functions, retrieves collection data from the Collector engine on a pre-determined time interval and defines a programming interface.

"Local Attached Storage" shall mean any storage device directly attached to a server through a interface standard such as Fiber Channel, SCSI or IDE. Examples of Local Attached Storage include SAN, NAS, and IDE and SCSI disks.

"Managed Object" shall mean any object where I/O activity is to be collected by the I/O Analyzer and includes servers, partitions, directories, files, processes and end-users.

III. System Architecture

Referring to FIG. 1, a block diagram illustrating the physical architecture of a computer network environment 100 in which the I/O analyzer software agent for storing, monitoring and reporting file I/O and physical disk I/O activity, according to an embodiment of the present invention, would operate.

Network 100 includes a plurality of end-users who would each access the resources of network 100 using a processing device 102 such as a terminal, a workstation (e.g., Sun® SPARC™ or NT™ workstation running the Sun® Solaris™, Microsoft® Windows 2000™ or XP™, or IBM® AIX™ operating system) or a personal computer (PC) (e.g., an IBM™ or compatible PC running the Microsoft® Windows 95/98™ or Windows NT™ operating system, Macintosh® computer running the Mac® OS operating system, or the like). (For simplicity, FIG. 1 shows processing devices 102*a-n*).

In alternative embodiments, users may access network 100 using any processing device 102 including, but not limited to, a desktop computer, workstation, laptop, palm-top, workstation, set-top box, personal digital assistant (PDA), and the like.

Network 100 includes an application server 104 which is the "back-bone"(i.e., processing) of the present invention. That is, an I/O analyzer 150 agent and its components execute on server 104. I/O analyzer 150 includes a collector engine (CE) process 110, a client process 120 and a service process 130.

CE process 110 is the component of the I/O analyzer 150 that consists of a set of I/O filter drivers that layer on the file system of the server 104 and the storage subsystem of network 100 to collect I/O information.

Client process 120 provides a graphical user interface (GUI) "front-end" screens to users of network 100 in the form of Web or other graphical-type pages on their workstations 102. These pages, when sent to the users' respective workstations 102, result in GUI screens being displayed.

Service 130 is the component of I/O analyzer 150 that performs management functions, retrieves collection data from the CE process 110 on a pre-determined periodic basis and defines a programming interface.

Network 100 also includes a local attached storage 108 (e.g., SAN, NAS, and IDE and SCSI disk array) which is directly attached to server 104 through a standard interface (e.g., Fiber Channel, SCSI, IDE or the like).

In an embodiment, collected I/O-related data and any predefined I/O metrics are stored in a central repository.

Thus, in such an embodiment, network 100 includes a central repository 112 that is a relational database (e.g., Oracle9i™ or Microsoft® SQL Server™ database) residing on a separate database sever 110. It will be apparent to one skilled in the relevant art(s) that central repository 112 may be mirrored for fault tolerance, and may be physically located on one or more computers which may or may not be the same as database server 110 or the server 104 being monitored.

In an embodiment, network 100 includes one or more administrative workstations 106 for use by the system or database administrator. (For simplicity, FIG. 1 shows one administrative workstation 106). Administrative workstation 106 allows the system administrator to access the programming interface of I/O analyzer 150, manually update configuration (i.e., static) database tables in repository 112, and update, maintain, monitor and log statistics related to server 104 and network 100 in general. Also, the administrative workstations maybe used "off-line" in order to enter configuration and user specific data, as well as to view the reports generated by the present invention as described herein.

I/O analyzer 150 implements an interface for management and control functions and communicates with CE process 110 to gather and store collection data. I/O analyzer 150 runs as a service on server 104 and is responsible for processing information stored in an internal collection buffer located within CE 110, saving the information to repository (e.g., database) 112 for future analysis and processing management and control commands from client process 120.

It will be apparent to one skilled in the relevant art(s), after reading the description herein, that network 100 in alternate embodiments may be a local area network (LAN), wide area network (WAN), intranet, or the like, include a plurality of servers 104, each running I/O analyzer process 150 in a central or distributed fashion, as well as a plurality of local attached storage volumes 108 and that the embodiment shown in FIG. 1 is for ease of explanation herein.

More detailed descriptions of the components within network 100, as well their functionality, are provided below.

IV. I/O Metrics

In an embodiment of the present invention, the CE 110 of I/O analyzer 150 will capture collection data for all file I/O that occurs within network 100 in which it is executing. Table 1 describes the file-related metrics (i.e., counters or data elements) captured by CE 110 in an embodiment of the present invention.

TABLE 1

| Metric | Description |
| --- | --- |
| Open Create | Number of opens that resulted in a file creation. This will identify excessive file creation and deletion activity such as temporary files. |
| Open Open | Number of actual file opens. Opens are an expensive operation and is a significant factor when measuring I/O performance. |
| Open Overwrite | Number of opens that overwrite an existing file. Overwrite opens the existing file and truncates the file to zero. The FileID is maintained. Opens are an expensive operation and is a significant factor when measuring I/O performance. |
| Open Supersede | Number of opens that supersede an existing file. The file is deleted and then re-created resulting in a different FileID. |
| Reads | Number of read operation on a file. |
| From File System | Number of reads satisfied from cache. A file system read may generate one or more disk reads. |

TABLE 1-continued

| Metric | Description |
| --- | --- |
| Sequential Reads | Number of sequential reads to a file. |
| Random Reads | Number of random reads to a file. |

Table 2 describes, in an embodiment, the read-related metrics (i.e., counters or data elements) captured by CE 110 for each disk volume within network 100 in which it is executing.

TABLE 2

| Metric | Description |
| --- | --- |
| Device | Number of disk members in the volume. |
| Reads | Number of read requests to disk. A greater number of reads from disk than file system reads may indicate fragmentation. |
| Read Time | Time to complete reads from the file system in 100 ns units. |
| Bytes Read From Disk | Number of bytes read from the file system. This information allows the service to determine if reads to a file are being done sequentially or randomly, the average I/O size, the number of I/Os, and the read/write ratio. In addition, the average I/O size, the number of I/Os, and the read/write ratio to a particular member of a disk volume are also determinable. |
| Read Time | Time to complete reads from the disk in 100 ns units. |
| Bytes Read | Number of bytes read from the disk. |
| Writes To File System | Number of writes satisfied from cache. |
| Sequential Writes | Number of sequential writes. |
| Random Writes | Number of random writes. |

Table 3 describes, in an embodiment, the write-related metrics (i.e., counters or data elements) captured by CE 110 for each disk volume within network 100 in which it is executing.

TABLE 3

| Metric | Description |
| --- | --- |
| Device | Member of the volume. |
| Writes | Number of writes to disk. More disk writes then file system writes may indicate fragmentation. |
| Write Time | Time to complete writes to the file system in 100 ns units. |
| File Bytes Written | Number of bytes written to the file system. This information should allow the service to determine if writes to a file is being done sequential or random, the average I/O size, the number of I/Os, and the read/write ratio. In addition, it should be able to determine the average I/O size, the number of I/Os, and the read/write ratio to a particular member of a volume. |
| Write Time | Time to complete write operations to disk in 100 ns units. |
| Disk Bytes Written | Number of bytes written to the disk. |
| Closes | Cleanup indicates that the user closed the file. The difference between the number of closes and opens determines the current open file count for the file. |
| Marked for Delete | Number of deletes requests for a file. |
| Lock/Unlock Byte Range | Number of lock/unlock requests. |
| Truncates | Number of file truncates. Truncates reduces the allocation portion of the file. All disk space allocation functions are I/O intensive. If a file is being truncated and extended frequently is reason for alarm. Performing multiple allocations leads to fragmentation. |
| Extends | Number of file extends. Extends increase the size of the file and if excessive extends are occurring, |

TABLE 3-continued

| Metric | Description |
|---|---|
| | the file would benefit from a larger pre-allocation size. All disk space allocation functions are I/O intensive. If a file is being extended frequently is reason for alarm. Performing multiple allocations leads to fragmentation. |
| Set Security | Number of changes to the security descriptor. |
| Flush Buffers | Number of flush buffers for the file. Flushes results in disk write I/O and is an expensive I/O operation. |
| Set Compression | Number of file compressions. This is an expensive disk operation. |
| Move File | Number of file moves. Used by defragmenters to move file extends during the defragmentation operation. |
| Read/Write Raw Encrypted | Number of read/writes bypassing the encrypted data. Used by backup applications. |

In an alternate embodiment, CE 110 within network 100 may simply collect the following metrics: Number of Reads; Number of Bytes; Read Time; Number of Sequential Reads; and Number of Random Reads, for the following categories of managed objects: file system reads; file system writes; disk reads; and disk writes.

In an embodiment, as will be appreciated by those skilled in the relevant art(s) after reading the description herein, the code logic implementing the present invention contains one data structure for each of the counters listed in Tables 1-3 for each server, logical device, physical device, file, application and end-user managed object.

V. Software Architecture

In an embodiment of the present invention, I/O analyzer 150 utilizes a series of database tables to accomplish two functions.

First, the database tables store information captured during data collection for later data analysis. In an embodiment, such tables are referred to as "activity tables" and contain discrete information for each collection interval.

Second, the database tables store configuration that is global in nature. In an embodiment, such tables are referred to as "master tables" and contain static information such as file names, device names and server names. In such an embodiment, logical links to the master tables, via an ID number, are kept in the activity tables.

Table 4 contains a list of activity tables employed by I/O analyzer 150 in one embodiment of the present invention. In such an embodiment, each activity table listed in Table 4 would have an entry for each device, file and application type managed object and timestamp.

TABLE 4

| Activity Table Name | Description |
|---|---|
| TimeStamp | Date/Time of entry |
| DeltaTime | Elapsed time from prior data collection in seconds |
| DeviceID | An auto-assigned device number from by the DeviceMaster table. |
| FileID | An auto-assigned file number from by FileMaster table. |
| ApplicationID | An auto-assigned process number from the Application Master table. |
| UserID | An auto-assigned process number by the Application Master table. |
| OpenCreate | Number of opens that resulted in a file creation. This will identify excessive file creation and deletion activity such as temporary files. |
| OpenOpen | Number of actual file opens. Opens are an expensive operation and is a significant factor when measuring I/O performance. |

TABLE 4-continued

| Activity Table Name | Description |
|---|---|
| OpenOverwrite | Number of opens that overwrite an existing file. Overwrite opens the existing file and truncates the file to zero. The FileID is maintained. Opens are an expensive operation and is a significant factor when measuring I/O performance. |
| OpenSupersede | Number of opens that supersede an existing file. The file is deleted and then re-created resulting in a different FileID. |
| FileSysReads | Read satisfied from cache. A file system read may or may not generate one or more disk reads. |
| FileSysSeqReads | Number of sequential reads to a file. |
| FileSysRandReads | Number of random reads to a file. |
| FileSysReadTime | Time to complete reads from the file system in 100 ns units. |
| FileSysReadBytes | Number of bytes read from the file system. |
| DiskReads | Number of reads requests to disk. More reads from disk then file system reads may indicate fragmentation. |
| DiskReadTime | Time to complete reads from the disk in 100 ns units. |
| DiskReadBytes | Number of bytes read from the disk. |
| FileSysWrites | Write satisfied from cache. |
| FileSysSeqWrites | Number of sequential writes. |
| FileSysRandWrites | Number of random writes. |
| FileSysWriteTime | Time to complete writes to the file system in 100 ns units. |
| FileSysWriteBytes | Number of bytes written to the file system. |
| DiskWrites | Number of writes to disk. More disk writes then file system writes may indicate fragmentation. |
| DiskWriteTime | Time to complete write operations to disk in 100 ns units. |
| DiskWriteBytes | Number of bytes written to the disk. |
| Close | Cleanup indicates that the user closed the file. The difference between the closes and Number of opens determines the current open file count for the file. |
| MarkedDeleted | Number of deletes requests for a file. |
| LockUnlock | Number of lock/unlock requests. |
| Truncates | Number of file truncates. Truncates reduces the allocation portion of the file. All disk space allocation functions are I/O intensive. If a file is being truncated and extended frequently is reason for alarm. Performing multiple allocations leads to fragmentation. |
| Extends | Number of file extends. Extends increase the size of the file and if excessive extends are occurring, the file would benefit from a larger pre-allocation size. All disk space allocation functions are I/O intensive. If a file is being extended frequently is reason for alarm. Performing multiple allocations leads to fragmentation. |
| SetSecurity | Number of changes to the security descriptor. |
| FlushBuffers | Number of flush buffers for the file. Flushes results in disk write I/O and is an expensive I/O operation. |
| SetCompression | Number of file compressions. This is an expensive disk operation. |
| MoveFile | Number of file moves. Used by defragmenters to move file extents during the defragmentation operation. |
| ReadWriteRaw | Number of read/writes bypassing the encrypted data. Used by backup applications. |

Table 5 contains a list of device-related master tables employed by I/O analyzer 150 in one embodiment of the present invention. In such an embodiment, each master table listed in Table 5 would have an entry for each server and device type managed object.

TABLE 5

| Device Master Table Name | Description |
| --- | --- |
| DeviceID | An auto-assigned number for each new Server/Device |
| Server | Name of the Server |
| Device | Name of the Device |
| Capacity | Capacity of the Device |
| SnapshotTimestamp | The timestamp of the last snapshot on the device |

Table 6 contains a list of file-related master tables employed by I/O analyzer 150 in one embodiment of the present invention. In such an embodiment, each master table listed in Table 6 would have an entry for each server, device and file type managed object.

TABLE 6

| File Master Table Name | Description |
| --- | --- |
| FileID | An auto-assigned number for each new DeviceID or File |
| DeviceID | The auto-assigned device number |
| FileName | Fully qualified file name |

Table 7 contains a list of application-related master tables employed by I/O analyzer 150 in one embodiment of the present invention. In such an embodiment, each master table listed in Table 7 would have an entry for each server and process type managed object and timestamp.

TABLE 7

| Application Master Table Name | Description |
| --- | --- |
| ApplicationID | An auto-assigned number for each new application (i.e., process) |
| Server | Name of the server |
| ImageName | The name of the image filer |
| ApplicationName | The name of the application |

Table 8 contains a list of user-related master tables employed by I/O analyzer 150 in one embodiment of the present invention. In such an embodiment, each master table listed in Table 8 would have an entry for each network end-user.

TABLE 8

| User Master Table Name | Description |
| --- | --- |
| UserID | An auto-assigned number for each new SID |
| UserName | Fully qualified user name |
| SID | O/S User ID |

VI. Monitoring Operation

Figure 2:
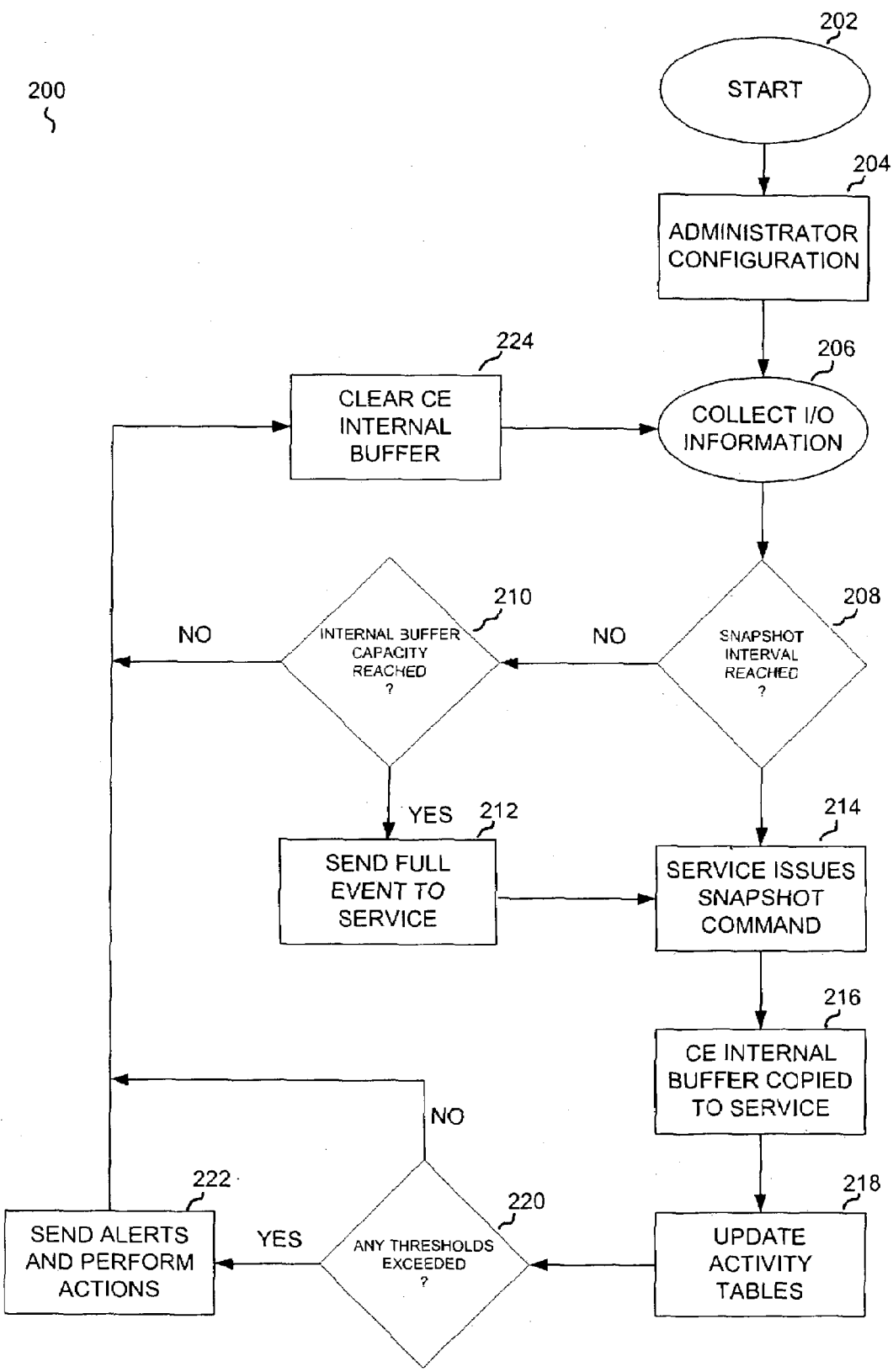
FIG. 2 is a flowchart depicting an embodiment of the operational process of the system of the present invention.

Referring to FIG. 2, a flowchart illustrating a monitoring process 200, according to an embodiment of the present invention, is shown. Process 200 begins at step 202 with control passing immediately to step 204.

In step 204, a user (i.e., the administrator of network 100) configures I/O analyzer 150. That is, the administrator, using administrative workstation 106 and a user interface provided by client process 120, would indicate thresholds, alerts, collection intervals, and the managed objects they wish to monitor within network 100. In an embodiment, this is accomplished by selecting managed objects—which may be all partitions, selected partitions or selected directories—on a per-server basis. The user may also define the type of files they wish to monitor. All processes that perform I/O's to a managed object will thus be monitored and all other I/O activity will not be collected nor monitored.

In an embodiment, client process 120 provides UI screens to administrative workstation 106 to define filters such as: (i) Include/Exclude Filters—which includes or excludes specified directories from the monitoring process; (ii) Associated File Types—which specifies file type(s) to monitor or exclude from monitoring; and (iii) Alerting Information—which are alert thresholds and actions stored as part of the managed object selected for monitoring. The configuration information from step 204 is stored in the master tables (i.e., Tables 5-8).

In step 206, I/O analyzer 150, executing on server 104, enters an execution loop where CE 110 collects I/O information for the specified managed objects via filter drivers layered on local attached storage 108. This collection data (i.e., the I/O metrics described in Tables 1-3 or subset thereof) is collected as end-users execute applications and access files on local attached storage 108 from their respective workstations 102. This collection data is then stored in the internal buffer of CE 110. In an embodiment, the maximum size of the internal buffer of CE 110 (e.g., N megabytes) is set by the administrator (e.g., in step 204).

In step 208, process 200 determines if the collection interval set by the administrator (e.g., in step 204) has been reached (e.g., every n number of seconds, minutes, etc.). If the determination of step 208 is negative, process 200 proceeds to step 210.

In step 210, CE 110 determines if its internal buffer has reached capacity. If the determination of step 210 is negative, process 200 proceeds back to step 204 (i.e., the start of the execution loop). If the determination of step 210 is positive, process 200 proceeds to step 212.

In step 212, CE 110 sends an event to service 130 that it has reached the maximum size of the internal buffer. Process 200 would then proceed to step 214.

In alternate embodiments, if the maximum buffer size is being reached, CE 110 may send a message to service 130 to let it know that data may be lost. Service 130 may then take a snapshot, dynamically increase the size of the buffer, change the frequency of the snapshot interval, or any combination of these.

Returning to step 208, if the determination of that step is positive, process 200 proceeds to step 214.

In step 214, either after the collection interval set by the administrator has been reached or the maximum size of the internal buffer has been reached, service 130 issues a "Snapshot" command to CE 110. In an embodiment, a snapshot is the action taken by service process 130 to retrieve collection data.

In step 216, when the snapshot is complete, CE 110 copies its internal buffer data into a user-mode mapped section of service 130.

In step 218, the service retrieves the collection data from the user-mode mapped section. Process 200 may then update the I/O metrics in the activity tables (i.e., Tables 1-3) stored in repository 112.

In step 220, process 200 determines if any I/O metric(s) have fallen outside any threshold(s) set by the administrator (e.g., in step 204). In an embodiment, thresholds may be deemed "informational," "warning," or "severe." In an alternate embodiment, the threshold exceeding determination is done by using calculated I/O metrics. Calculated I/O metrics, in an embodiment, are obtained by performing a computation or calculation involving one or more of the base I/O metrics of Tables 1-3 as variables. In an embodiment, the calculated metrics used to define thresholds are listed in Table 9.

TABLE 9

| Calculated I/O Metric | Definition |
|---|---|
| Opens & Close | Total open & close operations/elapsed time |
| Open Create File | Number of opens that resulted in a file creation. This will identify excessive file creation and deletion activity such as temporary files/elapsed time |
| Delete | Number of delete requests for a file/elapsed time. |
| Truncate | Number of file truncates/elapsed time. Truncates reduces the allocation portion of the file. All disk space allocation functions are I/O intensive. If a file is being truncated and extended frequently is reason for alarm. Performing multiple allocations leads to fragmentation. |
| Extend | Number of file extends/elapsed time. Extends increase the size of the file and if excessive extends are occurring, the file would benefit from a larger pre-allocation size. All disk space allocation functions are I/O intensive. If a file is being extended frequently is reason for alarm. Performing multiple allocations leads to fragmentation. |
| FileSystem I/O | Total file system I/O operations/elapsed time |
| FileSystem I/O Byte | Total file system I/O bytes/elapsed time |
| FileSystem Random I/O % | % of random I/O to a file. |
| FileSystem I/O Time | Time to complete I/O from the file system in 100 ns units. |

TABLE 9-continued

| Calculated I/O Metric | Definition |
|---|---|
| Non-Cached I/O % | This is the FileSystem I/O/Disk I/O* 100. A number of greater than 100 indicates fragmentation. |
| Disk I/O | Total reads & writes to disk/elapsed time |
| Disk I/O Time | Time to complete I/O from the Disk in 100 ns units |
| Disk I/O Bytes | Number of bytes written to the disk./elapsed time |
| Days Until Critical | The number of days until a specific metric reaches a critical level. How a critical level is determined is metric specific and will be detail later with each metric. |
| Maximum Disk I/O Rate | The theoretical maximum I/O rate for a physical device based on its device characteristics |
| Maximum Disk I/O Byte Rate | The theoretical maximum I/O rate for a physical device based on its device characteristics |

By using the calculated I/O metrics of Table 9 and then supplying specific numerical values (e.g., percentages) as limits, an administrator may then define thresholds. As will be appreciated by one skilled in the relevant art(s) after reading the description herein, client 120 may have pre-defined thresholds for the administrator to choose from, or allow the administrator to define their own custom thresholds. In one embodiment, an administrator may chose from or define the following thresholds listed in Table 10.

TABLE 10

| Managed Object | Threshold | Definition (i.e., computation) | Rationale for Employing Threshold |
|---|---|---|---|
| Server | Non-Cached I/O % | (Disk I/O Bytes/Filesystem I/O Bytes) * 100 | A high percentage could indicate problems in server or database tuning or a poorly written application. |
| Server | I/O Wait Time % | (Disk I/O Time/Elapsed Time) * 100 | A high percentage could indicate problems in server or database tuning or a poorly written application. |
| Application | I/O Wait Time % | (Disk I/O Time/Elapsed Time) * 100 | A large value indicates that the application is spending a large percent of its time waiting on I/O |
| Logical Device | Disk I/O Byte Rate % of Maximum Disk I/O Byte Rate | (Disk I/O Bytes/Elapsed Time)/Maximum Disk I/O Byte Rate | A large value indicates that the device may be reaching its maximum I/O capacity. |
| Application | OpenClose % | (Open & Close/Filesystem I/O) * 100 | A large value indicates that most of the Filesystem I/O are opens and closes, indicating a poorly written application. |
| Logical Device | Disk I/O Rate % of Maximum Disk I/O Rate | (Disk I/O/Elapsed Time)/Maximum Disk I/O Rate. | A large value indicates that the device may be reaching its Maximum I/O capacity. |
| Application | Extend % | (Extend/Filesystem I/O) * 100 | A large value could indicate that file space should be preallocated |
| User | I/O Wait Time % | (Disk I/O Time/Elapsed Time) * 100 | A high percentage could indicate problems in server or database tuning or a poorly written application. |

Returning to FIG. 2, if the determination of step 220 is negative, process 200 proceeds to step 224. Otherwise, process 200 proceeds to step 222.

In step 222, process 200 would perform any threshold actions set (e.g., defined in step 204) for each of the thresholds determined to have been exceeded in step 220. In an embodiment, actions taken when a threshold is exceeded would include the following actions listed in Table 11 which can be selected for each threshold when they are first defined.

TABLE 11

| Threshold Action | Description |
| --- | --- |
| Notify User | Sends notification message to the user who performed I/O that caused threshold to be exceeded. |
| Notify Administrator | Sends notification message to the administrator when an alarm has been activated. |
| Send SNMP trap | Use Simple Network Management Protocol (SNMP) traps to send the notification message to an SNMP client. The Machine Name, UserName, Object Name and Threshold Message will be sent to the SNMP client. |
| Record Alarm | Writes information to an audit database that an alarm has been activated. |
| Mail to: | mail address(es) where notification message will be sent. A link to client process 120 GUI page with detail on the offending device is included in the email. |
| Send to Event Log | Sends notification message to an event log. |
| Execute a Command | Executes a operating system command on the server 104. |
| Run a Report | Runs and optionally e-mails a report. |

The purpose of alerting is to send the user (e.g., system administrator) a message whenever I/O performance of a managed object falls outside of normal limits (i.e., thresholds). As will be appreciated by one skilled in the relevant art(s) after reading the description herein, in order to properly define thresholds a baseline of I/O performance must be established for the I/O rate and the I/O completion time of a managed object. Once a baseline is established a set of alerts may be defined as threshold percentages over the baseline. In an embodiment, the user would select the percentages to represent a confidence level based on the standard deviation of the baseline, (when assuming a normal distribution of the baseline data).

In step 224, the CE 110 empties its internal buffer and process 200 proceeds back to step 204 (i.e., the start of the execution loop) until the loop is (forcibly) exited (by the administrator to, for example, reconfigure the I/O analyzer 150 by returning to step 204, or otherwise) as will be appreciated by one skilled in the relevant art(s).

VII. Reports

As described herein, I/O analyzer 150 is a monitoring and reporting facility which provides filters and sorting functions so I/O activity may be categorized within network 100 by process or storage location.

In an embodiment, the user may perform data analysis to identify applications that are causing I/O bottlenecks and obtain information to allow optimization of such applications so that these bottlenecks can be eliminated or reduced. This can be done both by allowing interactive data analysis and with predefined reports (both via client process 120 sending GUI pages to administrative workstation 106, or even any workstation 102). In an embodiment of the present invention, a user making use of client 130 is able to request and view the predefined reports listed in Table 12.

TABLE 12

| Report Name | Description |
| --- | --- |
| Most Active Files by Partition for a Time Interval | Report shows the most active files based on total Filesystem I/O across all partitions for the selected time interval. |
| Slowest Files by Partition for a Time Interval | Report shows the files that waited the most for I/O across all partitions for the selected time interval |
| Most Active Files by User for a Time Interval | Report shows the most active files based on total Filesystem I/O across all users for the selected time interval |
| Most Active Files by Process for a Time Interval | Report shows the most active files based on total Filesystem I/O across all processes for the selected Time interval |
| Slowest Files by Process for a Time Interval | Report shows the processes that waited the most for I/O across all partitions for the selected time interval |
| Most Active Partitions for a Time Interval. | Report shows the most active partitions based on total Filesystem I/O for the selected time interval |
| Slowest Partitions for a Time Interval | Report shows the partitions that waited the most for I/O for the selected time interval |
| Most Active Users for a Time Interval | Report shows the most active users based on total Filesystem I/O for the selected time interval |
| Trend of I/O Activity by Partition for a Time Interval | Report shows graph of trend of time versus Filesystem I/O for the top ten most active partitions with the number of days projected for each partition to be two standard deviations above the baseline. The report grid shows supporting detail for all partitions |
| Trend of I/O Wait Time by Partition for a Time Interval | Report shows graph of trend of time versus Disk read/write time for the top ten most active partitions with the number of days projected for each partition |

TABLE 12-continued

| Report Name | Description |
|---|---|
| | to be two standard deviations above the baseline. The report grid shows supporting detail for all partitions |
| Trend of I/O Activity by Process for a Time Interval | Report shows graph of trend of time versus Filesystem I/O for the top ten most active processes with the number of days projected for each process to be two standard deviations above the baseline. The report grid shows supporting detail for all processes |
| Trend of I/O Wait Time by Process for a Time Interval | Report shows graph of trend of time versus Disk read/write time for the top ten most active processes with the number of days projected for each process be two standard deviations above the baseline. The report grid shows supporting detail for all processes |

In an alternate embodiment, new reports may also be defined using a report writer provided on administrative workstation 106 by client process 120. In such an embodiment, the user may request to select reports per managed object type (e.g., by file, application, server, end-user, logical device, physical device or the like). In one embodiment, all reports may be run interactively, scheduled (e.g., hourly, daily, weekly, monthly, etc.) or generated as an alert action (i.e., step 222 of process 200). In one embodiment, reports may be generated in any one of several available formats, such as text, Hypertext Markup Language (HTML) or comma separated values (CSV) format and saved to the file system or e-mailed to one or more recipients.

VIII. Example Implementations

Figure 3:
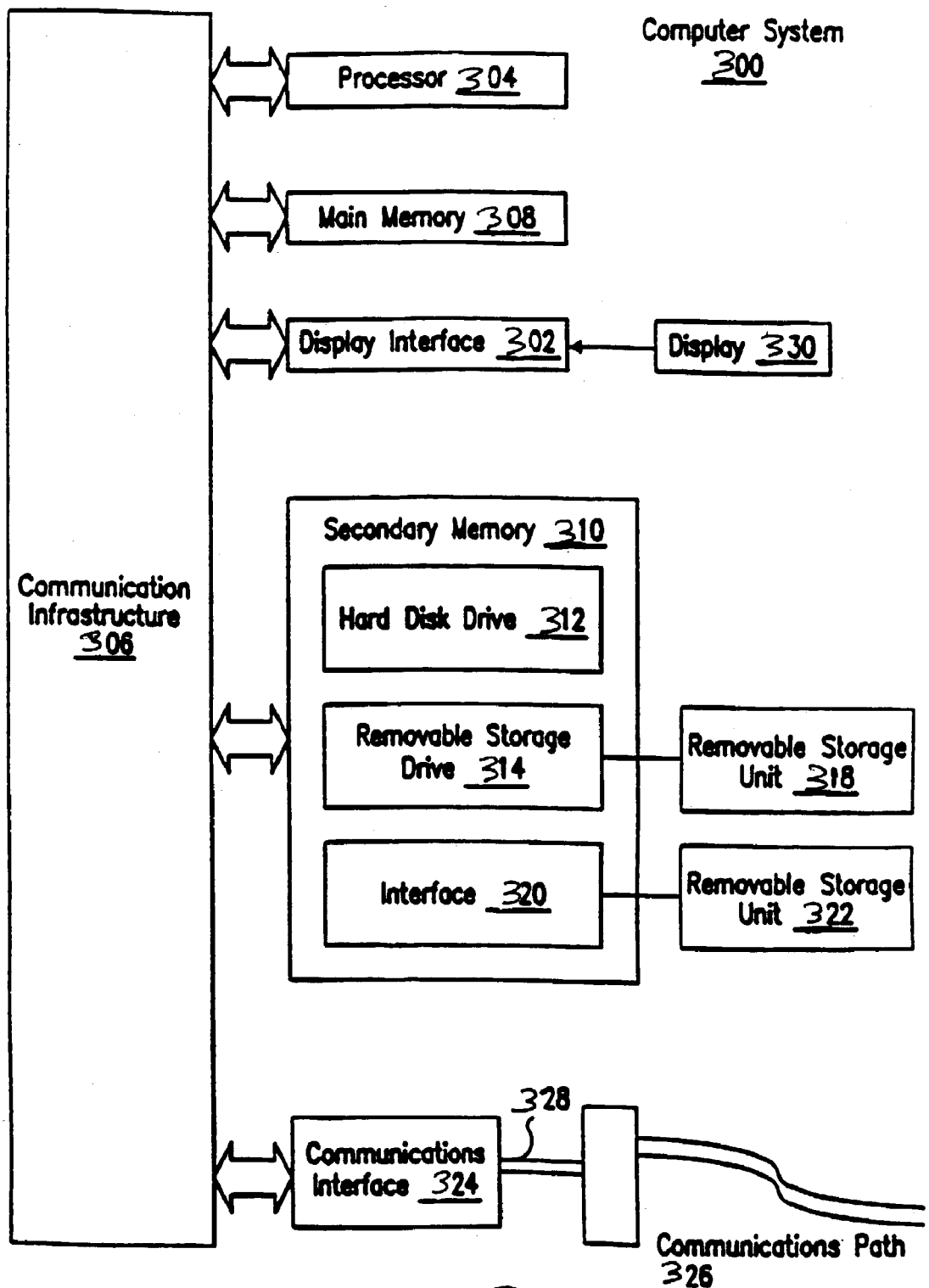
FIG. 3 is a block diagram of an exemplary computer system useful for implementing the present invention.

The present invention (i.e., I/O analyzer 150, process 200, and/or any part(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 300 is shown in FIG. 3.

Computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IX. Conclusion

It should be understood that Tables 1-12 and FIGS. 1-2, which highlight the functionality and other advantages of I/O analyzer 150, are presented for example purposes only. The architecture of the present invention is sufficiently flexible and configurable such that users may utilize I/O analyzer 150 in ways other than that shown in Tables 1-12 and FIGS. 1-2 (e.g., the use of different I/O metrics, tables, report formats and the like).

While various embodiments of the present invention have been described above, it should be understood that they have been presented by way of example and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method comprising:
   identifying a critical threshold of a file I/O metric associated with a managed object;
   establishing a baseline level of I/O performance associated with the file I/O metric, wherein said critical threshold is defined relative to the baseline level;
   collecting a plurality of values of the file I/O metric, wherein each value of the plurality of values is collected over a specified time interval;
   determining, using at least the plurality of values of the file I/O metric, a time period after which the file I/O metric is expected to reach the critical threshold; and
   providing a report indicating the determined time period.

2. The method as recited in claim 1, wherein the file I/O metric comprises a number of file open operations, wherein the method further comprises:
   classifying the file open operations into a plurality of categories, including a first category of file open operations that resulted in a file creation and a second category of file open operations that resulted in an overwrite of an existing file.

3. The method as recited in claim 2, wherein the plurality of categories includes a third category of file open operations that resulted in an existing file being superseded.

4. The method as recited in claim 1, wherein the file I/O metric comprises a number of file truncate operations.

5. The method as recited in claim 1, wherein the file I/O metric comprises a number of file extend operations.

6. The method as recited in claim 1, wherein the file I/O metric comprises a number of file compression operations.

7. A system, comprising:
   a processor; and
   memory coupled to the processor, wherein the memory includes program instructions executable by the processor to implement an I/O analyzer configured to:
      identify a critical threshold of a file I/O metric associated with a managed object;
      establish a baseline level of I/O performance associated with the file I/O metric, wherein said critical threshold is defined relative to the baseline level;
      collect a plurality of values of the file I/O metric, wherein each value of the plurality of values is collected over a specified time interval;
      determine, using at least the plurality of values of the file I/O metric, a time period after which the file I/O metric is expected to reach the critical threshold; and
      providing a report indicating the determined time period.

8. The system as recited in claim 7, wherein the file I/O metric comprises a number of file open operations, wherein the I/O analyzer is further configured to:
   classify the file open operations into a plurality of categories, including a first category of file open operations that resulted in a file creation and a second category of file open operations that resulted in an overwrite of an existing file.

9. The system as recited in claim 8, wherein the plurality of categories includes a third category of file open operations that resulted in an existing file being superseded.

10. The system as recited in claim 7, wherein the file I/O metric comprises a number of file truncate operations.

11. The system as recited in claim 7, wherein the file I/O metric comprises a number of file extend operations.

12. The system as recited in claim 7, wherein the file I/O metric comprises a number of file compression operations.

13. A computer readable storage medium comprising program instructions, wherein the instructions are computer-executable to implement an I/O analyzer configured to:
   identify a critical threshold of a file I/O metric associated with a managed object;
   establish a baseline level of I/O performance associated with the file I/O metric, wherein said critical threshold is defined relative to the baseline level;
   collect a plurality of values of the file I/O metric, wherein each value of the plurality of values is collected over a specified time interval; and
   determine, using at least the plurality of values of the file I/O metric, a time period after which the file I/O metric is expected to reach the critical threshold; and
   provide a report indicating the determined time period.

14. The computer readable storage medium as recited in claim 13, wherein the file I/O metric comprises a number of file open operations, wherein the I/O analyzer is further configured to:
   classify the file open operations into a plurality of categories, including a first category of file open operations that resulted in a file creation and a second category of file open operations that resulted in an overwrite of an existing file.

15. The computer readable storage medium as recited in claim 14, wherein the plurality of categories includes a third category of file open operations that resulted in an existing file being superseded.

16. The computer readable storage medium as recited in claim 13, wherein the file I/O metric comprises a number of file truncate operations.

17. The computer readable storage medium as recited in claim 13, wherein the file I/O metric comprises a number of file extend operations.

18. The computer readable storage medium as recited in claim 13, wherein the file I/O metric comprises a number of file compression operations.

* * * * *